(12) United States Patent
Kita

(10) Patent No.: US 8,910,767 B2
(45) Date of Patent: Dec. 16, 2014

(54) OPEN/CLOSE MEMBER DRIVING APPARATUS

(75) Inventor: Shinichiro Kita, Nirasaki (JP)

(73) Assignee: Mitsui Kinzoku Act Corporation, Yokohama-shi (JP)

( * ) Notice: Subject to any disclaimer, the term of this patent is extended or adjusted under 35 U.S.C. 154(b) by 1106 days.

(21) Appl. No.: 11/892,234

(22) Filed: Aug. 21, 2007

(65) Prior Publication Data

US 2008/0053781 A1 Mar. 6, 2008

(30) Foreign Application Priority Data

Sep. 5, 2006 (JP) .................................. 2006-240548

(51) Int. Cl.
*F16D 27/112* (2006.01)
*E05F 15/14* (2006.01)
*H02K 7/108* (2006.01)
*H02K 7/116* (2006.01)

(52) U.S. Cl.
CPC ............ *H02K 7/1085* (2013.01); *F16D 27/112* (2013.01); *E05Y 2800/11* (2013.01); *E05Y 2800/73* (2013.01); *E05Y 2600/626* (2013.01); *E05Y 2201/462* (2013.01); *E05Y 2201/246* (2013.01); *E05Y 2201/216* (2013.01); *E05F 15/146* (2013.01); *H02K 7/1166* (2013.01)
USPC ........................................ 192/84.961; 49/360

(58) Field of Classification Search
CPC .............................. F16D 27/112; H02K 7/1085
USPC ....................... 192/84.1, 84.961; 49/352, 360
See application file for complete search history.

(56) References Cited

U.S. PATENT DOCUMENTS

| | | | | |
|---|---|---|---|---|
| 754,291 | A | * | 3/1904 | Eastwood ................... 192/84.91 |
| 3,091,316 | A | * | 5/1963 | Huffman ....................... 192/150 |
| 4,346,616 | A | * | 8/1982 | Geisslinger et al. ..... 192/84.961 |
| 5,639,074 | A | * | 6/1997 | Greenhill et al. ............. 267/162 |

(Continued)

FOREIGN PATENT DOCUMENTS

| EP | 1 566 511 A2 | 8/2005 |
|---|---|---|
| GB | 2 124 696 A | 2/1984 |

(Continued)

OTHER PUBLICATIONS

Shinichiro Kita, USPTO Office Action, U.S. Appl. No. 11/785,882, Mar. 16, 2011, 13 pages.

(Continued)

*Primary Examiner* — Ramya Burgess
*Assistant Examiner* — Terry Chau
(74) *Attorney, Agent, or Firm* — Foley & Lardner LLP

(57) ABSTRACT

A clutch mechanism includes a field core into which an electromagnetic coil is incorporated and is fixed to a base member, a rotor rotatably fitted on a shaft and passing through a central portion of the field core to be connected to a speed reduction mechanism and an armature accommodated on an inside diameter side of the output drum. The armature is fitted on the shaft in order to rotate and move in an axial direction and is magnetically attracted to the rotor when the electromagnetic coil is energized. Drum side locking portions are provided inside of the output drum such that armature side locking portions provided on an outer circumferential portion of the armature can move in an axial direction of the shaft relative thereto and can be brought into engagement therewith in a rotational direction to transmit the rotation of the armature to the output drum.

10 Claims, 6 Drawing Sheets

(56) References Cited

U.S. PATENT DOCUMENTS

| | | | |
|---|---|---|---|
| 6,237,737 B1 * | 5/2001 | Jorgensen et al. | 192/84.92 |
| 6,409,000 B1 | 6/2002 | Itoh et al. | |
| 7,275,629 B2 | 10/2007 | Fukumoto et al. | |
| 8,109,041 B2 * | 2/2012 | Kita | 49/360 |
| 8,322,074 B2 * | 12/2012 | Kita et al. | 49/360 |
| 2005/0055883 A1 | 3/2005 | Sato et al. | |
| 2005/0183924 A1 * | 8/2005 | Fukumoto et al. | 192/84.961 |
| 2006/0156630 A1 | 7/2006 | Yokomori et al. | |
| 2007/0246322 A1 * | 10/2007 | Schachtl et al. | 192/84.31 |

FOREIGN PATENT DOCUMENTS

| | | | |
|---|---|---|---|
| GB | 2414038 A | * | 11/2005 |
| JP | 62-59270 U | | 4/1987 |
| JP | 2005-232918 | | 9/2005 |

OTHER PUBLICATIONS

USPTO Notice of Allowance, U.S. Appl. No. 11/785,882, Oct. 7, 2011, 15 pages.

S. Kita, U.S. PTO Non-Final Office Action, U.S. Appl. No. 11/785,882, dated Sep. 27, 2010, 18 pgs.

* cited by examiner

OPEN/CLOSE MEMBER DRIVING APPARATUS

This application claims priority from Japanese Patent Application No. 2006-240548, filed on Sep. 5, 2007, the entire subject matter of which is incorporated herein by reference.

BACKGROUND OF THE INVENTION

1. Field of the Invention

The present invention relates to an open/close member driving apparatus for opening and closing an open/close member which is supported on a vehicle body or the like in such a manner as to be opened and closed.

2. Description of the Related Art

Heretofore, open/close member driving apparatus includes an output drum and a clutch mechanism. The output drum is pivotally supported on a base member via a shaft in such a manner as to rotate freely and round an outer circumferential surface of which a cable which transmits a driving force to an open/close member such as a sliding door is wound. The clutch mechanism, into which a driving force from a motor is inputted via a speed reduction mechanism, is switched between an engaged state in which the driving force is transmitted to the output drum and a disengaged state in which the driving force is not so transmitted.

The clutch mechanism includes an annular field core into which an electromagnetic coil is incorporated and which is fixed to the base member, a rotor which is fitted rotatably on the shaft on which the output drum is pivotally supported and which can rotate by a driving force from the motor, and an armature which is supported in such a manner as to rotate and move axially relative to the shaft. The clutch mechanism is put in an engaged state by magnetically attracting the armature to the rotor when the electromagnetic coil is energized so as to transmit a rotation of the rotor to the output drum via the armature. Accordingly, the clutch mechanism thereby moves the open/close member to its open and closed positions via the transmission member (refer, for example, to JP-A-2005-232918 [FIGS. 4, 5]).

In the related open/close member driving apparatus that has been described above, power transmission between the armature and the output drum is enabled via a power transmission portion which is realized by bringing projections provided on an internal side of an end lid portion of the output drum into engagement with engagement holes provided in the armature. In addition, the position of the power transmission member is set in a substantially intermediate position between the shaft and an inner circumferential surface of the drum. Because of this, a rotational torque acting on the projections on the output drum becomes large, compared to a case where the power transmission portion is provided in a position lying close to the inner circumferential surface of the drum. Thus, countermeasures need to be taken such as those in which the projections on the output drum are made so thick as to bear a resulting high load or the output drum itself is formed of a relatively expensive, high-strength resin material. However, making the projections thicker has resulted in a problem that the overall size of the driving apparatus is enlarged, and forming the output drum of the high-strength resin material has resulted in a problem that the production costs are increased.

SUMMARY OF THE INVENTION

An object of the invention is to provide an open/close member driving apparatus which can decrease a load applied to the power transmission portion which transmits the driving force from the armature to the output drum.

According to a first aspect of the invention, there is provided an open/close member driving apparatus including: a motor; a transmission member for transmitting a driving force of the motor to an open/close member; a speed reduction mechanism; a base member; a field core that includes an electromagnetic coil and is fixed to the base member; a shaft; a rotor that is rotatably fitted on the shaft and passes through a central portion of the field core to be connected to the speed reduction mechanism; an armature that is accommodated inside of the output drum and is fitted on the shaft rotatably and movably in an axial direction and includes an armature side locking portion on an outer circumferential portion thereof, the armature being magnetically attracted to the rotor when the magnetic coil is energized; an output drum that is integrally formed with the shaft and is pivotally supported on the base member via the shaft, an outer circumferential surface of which is wound the transmission member, an inner circumferential surface of which includes a drum side locking portion, the drum side locking portion engaging with the armature side locking portion in a rotational direction such that a rotation of the armature is transmitted to the output drum and the armature is movable in an axial direction of the shaft.

According to a second aspect of the invention, the drum side locking portion includes a recessed portion and a raised portion extending in the axial direction and provided alternately in a circumferential direction.

According to a third aspect of the invention, the drum side locking portion includes a plurality of recessed portions and raised portions.

According to a fourth aspect of the invention, the armature side locking portion includes a recessed portion and a raised portion that are provided alternately in an circumferential direction in such a manner as to fit in and on the recessed portion and raised portion of the drum side locking portion.

According to a fifth aspect of the invention, the armature side locking portion includes a plurality of recessed portions and raised portions.

According to a sixth aspect of the invention, the open/close member driving mechanism further includes a wave washer between the rotor and the armature.

According to a seventh aspect of the invention, the open/close member driving mechanism further includes a clutch mechanism into which the driving force from the motor is inputted and switches between an engaged state in which the driving force is transmitted to the output drum and a disengaged state in which the driving force is not so transmitted, wherein the clutch mechanism includes the field core, the rotor and the armature.

According to an eighth aspect of the invention, an engagement piece protruding in the axial direction is provided on one of an internal side of an end lid portion of the output drum and a side of the armature that face each other, an engagement hole is provided on another one of the internal side of the end lid portion of the output drum and the side of the armature, and the engagement piece engages with the engagement hole so as to restrict a radial movement of the armature relative to the output drum.

According to the aspects of the invention, the power transmission portion realized by virtue of the engagement between the armature side locking portion and the drum side locking portion is set in the position which is spaced radially away from the rotational center of the armature and the output drum to a maximum extent. Accordingly, the load applied to the power transmission portion can be decreased and the power transmission portion is made superior in strength.

According to the aspects of the invention, the coupling of power between the output drum and the armature can easily be performed by fitting the recessed and raised portions formed on the outer circumferential portion of the armature in the recessed and raised portions formed on the inner circumferential portion of the output drum, respectively.

According to the aspects of the invention, the plurality of recessed and raised portions are provided on each of the output drum and the armature. Accordingly, the load applied to the individual recessed and raised portions can be decreased so as to decrease the possibility of failure thereof due to fatigue, thereby making it possible to maintain proper the functions of the recessed and raised portions over a long period of time.

According to the aspects of the invention, the radial movement of the armature relative to the output drum is restricted by virtue of the engagement between the engagement piece and the engagement hole. Accordingly, the output drum side recessed and raised portions and the armature side recessed and raised portions can be fitted in and on each other in an ensured fashion and the driving force can be transmitted from the armature to the output drum in an ensured fashion.

DETAILED DESCRIPTION OF THE PREFERRED EMBODIMENTS

Figure 1:
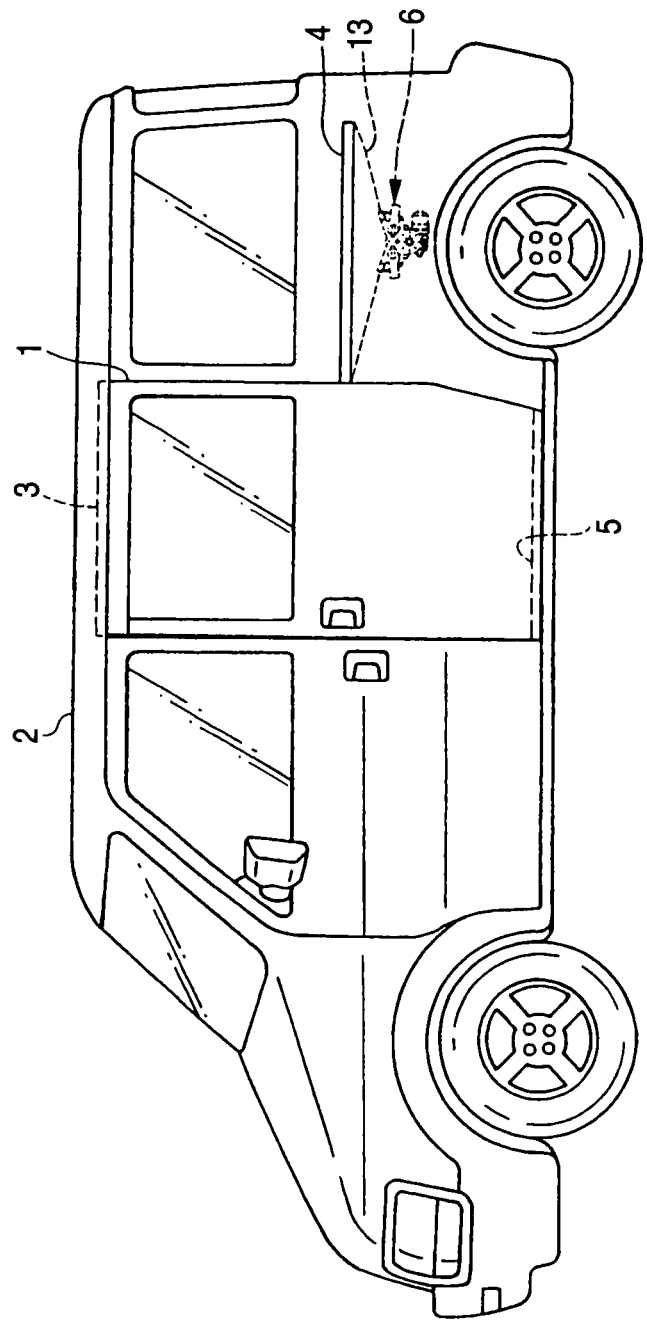
FIG. 1 is a side view of a vehicle to which an embodiment of the invention is applied.
Figure 2:
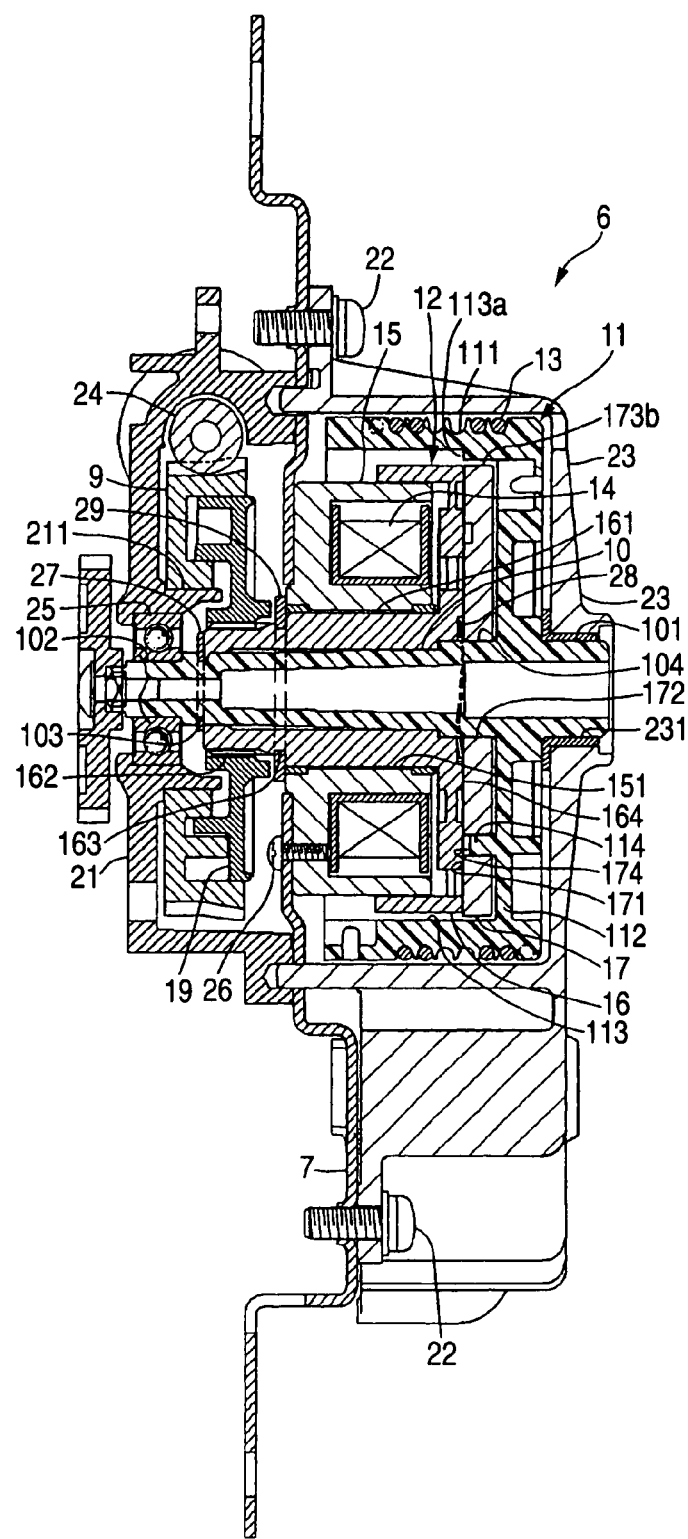
FIG. 2 is a vertical sectional view of a driving apparatus.
Figure 3:
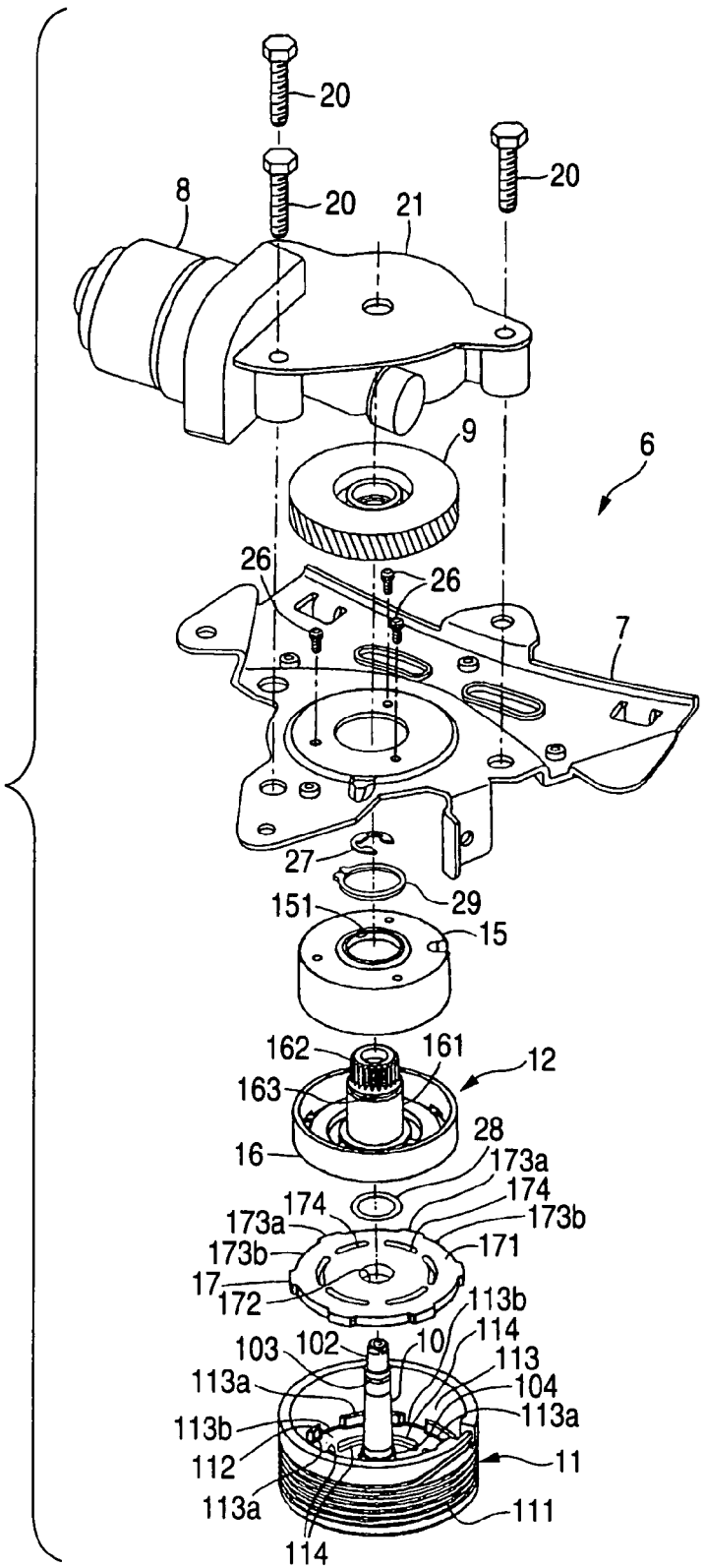
FIG. 3 is an exploded perspective view of the driving apparatus.
Figure 4:
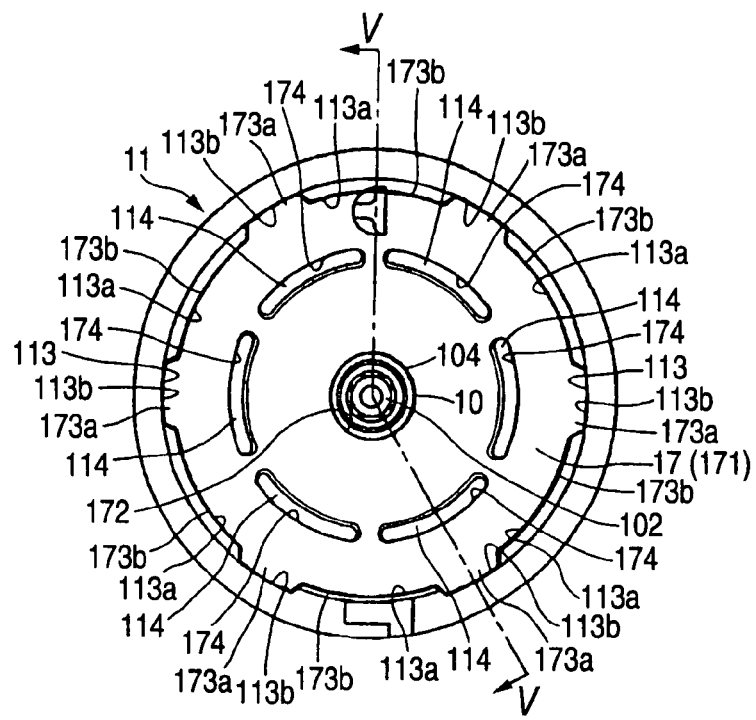
FIG. 4 is a front view of an output drum and an armature.
Figure 5:
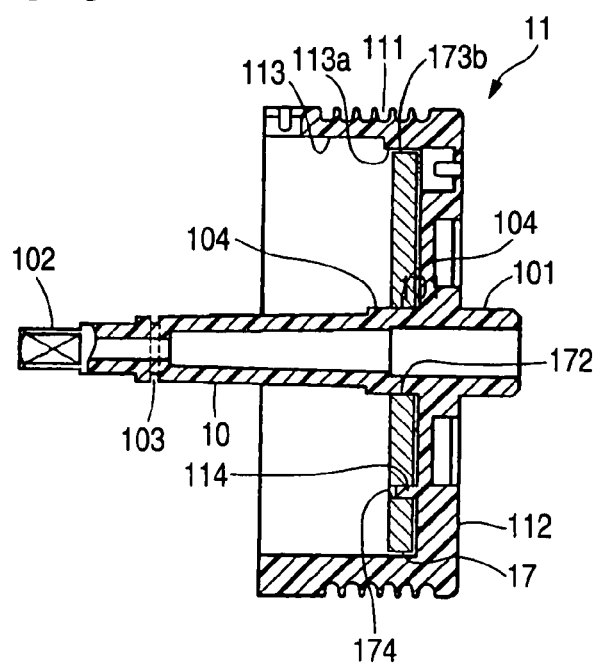
FIG. 5 is a sectional view taken along the line V-V in FIG. 4.
Figure 6:
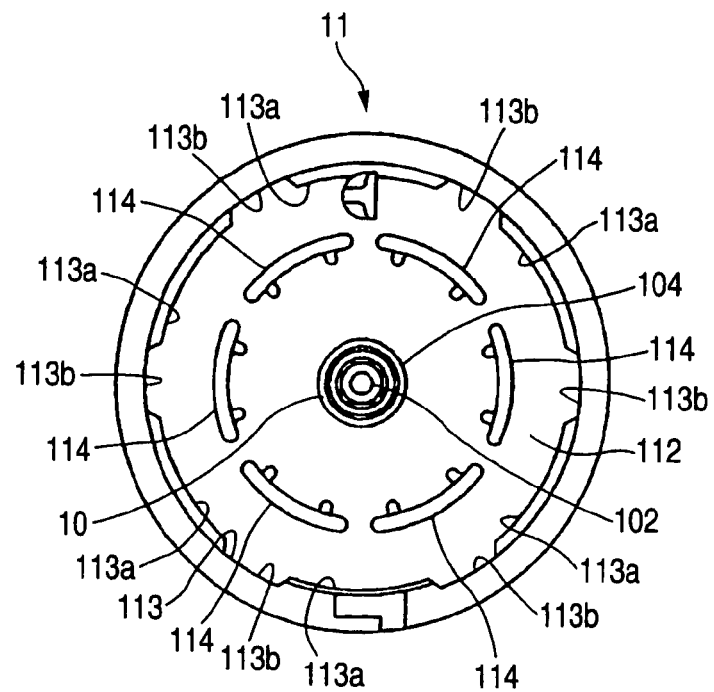
FIG. 6 is a front view of the output drum.
Figure 7:
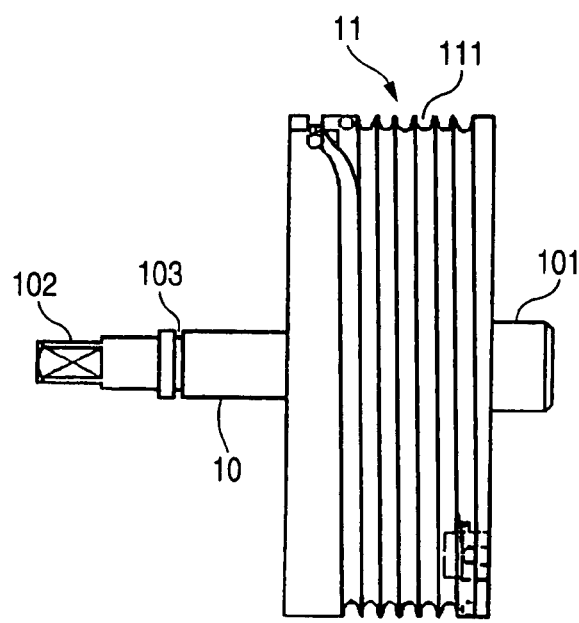
FIG. 7 is a side view of the output drum.
Figure 8:
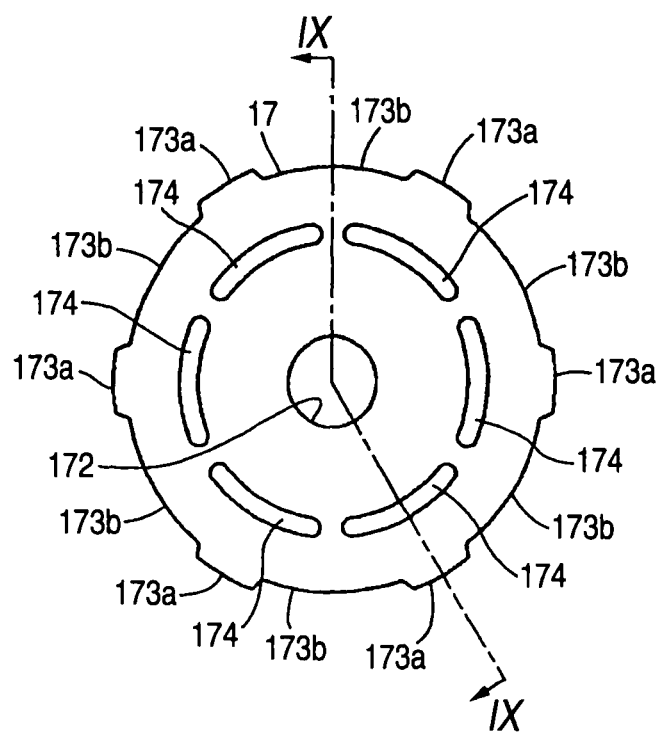
FIG. 8 is a front view of the armature.
Figure 9:
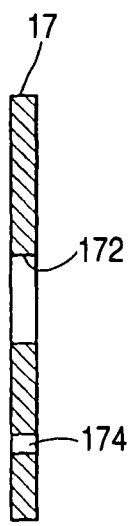
FIG. 9 is a sectional view taken along the line IX-IX in FIG. 8.

Hereinafter, an embodiment of the invention will be described based on the drawings. FIG. 1 is a side view of a vehicle to which an embodiment of the invention is applied. FIG. 2 is a vertical sectional view of a driving apparatus. FIG. 3 is an exploded perspective view of the driving apparatus. Note that in the following description, the left in FIG. 1 is regarded as the "front" and the right in FIG. 1 is as the "rear."

As is shown in FIG. 1, a sliding door (1), which constitutes an open/close member of a minivan or wagon type vehicle, is supported in such a manner as to slide forwards and backwards to cover and uncover a corresponding entrance/exit opening in a vehicle body (2) by upper, center, and lower guide rails (3), (4), (5) which are provided on a side of the vehicle body (2). By manual operation or by a driving apparatus (6) assembled to the rear of the vehicle body (2), the sliding door can be moved slightly outboards of an outer surface of the vehicle body (2) from its totally closed position where it covers the entrance/exit opening in the vehicle body (2) to then be moved rearwards along the side of the vehicle body (2) to a fully opened position and be moved forwards to the original, totally closed position.

As shown in FIGS. 2, 3, the driving apparatus (6) includes a metallic base plate (7) which constitutes a base member which is fixed to the vehicle body (2), a motor (8) which can rotate forwards and backwards, a worm wheel (9) which constitutes a speed reduction mechanism which can rotate while reducing a rotational speed of the motor (8), a synthetic resin output drum (11) which is pivotally supported in such a manner as to rotate freely by a shaft (10) which is oriented laterally in FIG. 2 and round which a cable (13) which constitutes a transmission member for transmitting a driving force of the motor (8) to the sliding door (1) is wound for connection thereto, and a clutch mechanism (12) which can be engaged and disengaged to connect and disconnect a driving force transmission path between the worm wheel (9) and the output drum (11).

A gear housing (21), which accommodates therein the worm wheel (9), is fixed to one side (a left side in FIG. 2, and an upper side in FIG. 3) of the base plate (7) with screws 20. A housing (23) which accommodates therein the output drum (11) and the clutch mechanism (12) is fixed to another side (a right side in FIG. 2, and a lower side in FIG. 3) of the base plate (7) by screws (22). Note that the motor (8) is mounted on the one side of the base plate (7) via the gear housing (21).

The cable (13), which is wound round an outer circumference of the output drum (11), is hooked round, respectively, guide members (not shown) provided at front and rear end portions of the guide rail (4). The cable (13) is laid to extend along the guide rail (4) and is connected to the sliding door (1) at end portions thereof.

As is shown in FIG. 2, the worm wheel (9) is fitted on a cylindrical bearing cylinder portion (211) provided in an interior of the gear housing (21), so as to be supported rotatably inside the gear housing (21). The worm wheel (9) meshes with a worm (24) which is securely fixed to an output shaft of the motor (8) and rotates while reducing the rotational speed of the motor (8).

A damper plate (19) is provided on an inside diameter side of the worm wheel (9) in such a manner as to rotate together with the worm wheel (9). This damper plate (19) is such as to dampen impact when the rotation of the worm wheel (9) to a rotor (16), which will be described later on.

As is shown in FIGS. 2 to 7, the output drum (11) is formed substantially into a bottomed cylindrical shape and has a spiral groove formed to extend round the outer circumferential surface thereof so that the cable (13) is wound thereround. In addition, a shaft (10) is formed integrally in a central portion of an end lid portion (112).

One end portion (101) of the shaft (10) which projects from an external side (a right side in FIG. 2, and a lower side in FIG. 3) of the end lip portion (112) of the output drum (11) towards the housing (23) side is pivotally fitted in a bearing hole (231) provided in the housing (23) in such a manner as to rotate freely. Another end portion (102) which similarly projects from an internal side (a left side in FIG. 2, and an upper side in FIG. 3) of the end lid portion (112) of the output drum (11) towards the gear housing (21) side is rotatably supported inside the bearing cylinder portion (211) via a bearing (25).

A diametrically expanded portion (104) is formed at a root portion of the shaft (10) which projects from the internal side of the end lid portion (112) of the output drum (11). A fitting groove (103) is provided in a position on an outer circumference of the shaft (10) which lies closer to the another end portion (102) so that an E-washer (27) is fitted therein in an axial direction.

After an armature (17) and a bearing cylinder portion (161) of a rotor (16) are rotatably fitted on the shaft (10), the E-washer (27) is fitted in the fitting groove (103) provided on the outer circumference of the shaft (10). Accordingly, an axial looseness of the rotor (16) relative to the shaft (10) is restricted. The armature (17) and the rotor (16) will be described later on.

Raised portions (113a) and recessed portions (113b), which constitute a drum side locking portion, are formed six each on an inner circumferential portion (113) which lies adjacent to the internal side of the end lid portion (112) of the output drum (11) in such a manner as to be spaced away substantially at equal intervals in a circumferential direction. In addition, six engagement pieces (114), which project towards the gear housing (21) at a substantially intermediate position between the output drum (11) and the shaft (10), are provided on the internal side of the end lid portion (112) in such a manner as to be positioned substantially at equal intervals in the circumferential direction.

The clutch mechanism (12) includes the substantially cylindrical field core (15), the rotor (16) and the armature (17). The field core (15) having an electromagnetic coil (14) incorporated therein is made of a magnetic material and is fixed to another side of the base plate (7) by screws (26). The rotor (16) is rotatably fitted on the shaft (10) passing through a through hole (151) provided in a central portion of the field core (15). The armature (17) is fitted on the diametrically expanded portion (104) of the shaft (10) rotatably and slightly movably in the axial direction in such a manner as that a friction surface (171) thereof faces a friction surface (164) of the rotor (16). The rotor (16), the armature (17) and the field core (15) are accommodated on an inside diameter side of the output drum (11).

The rotor (16) is made of a magnetic material and has the bearing cylinder portion (161) which projects (leftwards in FIG. 2) from an opposite side of the friction surface (164) and is fitted rotatably on the shaft (10). This bearing cylinder portion (161) passes through the through hole (151) of the field core (15) and the through hole (73) of the base plate (7) together with the shaft (10). A knurled (162) portion is formed at an end portion of the bearing cylinder portion (161) so as to be connected to the worm wheel (9) via the damper plate (19). In addition, a fitting groove (163) is recessed into an outer circumference of the bearing cylinder portion (161) so that a ring member (29) is fitted therein in an axial direction.

The ring member (29) is fitted in the fitting groove (163) on the bearing cylinder portion (163) after the bearing cylinder portion (161) of the rotor (16) is passed through a through hole (151) in the field core (15). Accordingly, an axial looseness of the rotor (16) is restricted.

As is shown in FIGS. 2 to 5, 8 and 9, the armature (17) is a disc element made of a magnetic material and having a through hole (172) in a center thereof which is fitted on the diametrically expanded portion (104) of the shaft (10) in such a manner as to freely rotate thereon and slightly move in the axial direction. Raised portions (173a) and recessed portions (173b), which constitute an armature side locking portion, are provided six each alternately in a circumferential direction on an outer circumferential portion thereof in such a manner as to correspond, respectively, to the raised portions (113a) and the recessed portions (113b) which constitute the drum side locking portion of the output drum (11).

Individual raised portions (173a) and individual recessed portions (173b) of the armature side locking portion are brought into engagement with the recessed portions (113b) and raised portions (113a) of the drum side locking portion, respectively, in such a manner as to be allowed to move relative to the axial direction of the shaft (10) but be restricted from moving in the circumferential direction, that is, the rotational direction so as to eliminate the looseness of the armature. Thus, by bringing the armature side locking portion (173a), (173b) into engagement with the drum side locking portion (113a), (113b) in this way, the rotation of the armature can be transmitted to the rotor (16) in an ensured fashion. Further, the armature (17) can be moved in directions in which the friction surface (171) is attracted to and separated from the friction surface (164) of the rotor (16) in an ensured fashion.

Six engagement holes (174) are formed substantially at equal intervals in a circumferential direction on a side of the armature (17) in such a manner as to correspond, respectively, to the individual engagement pieces (114) on the output drum (11) so that the engagement pieces (114) can be fitted therein, respectively. While the individual engagement pieces (114) and the individual engagement holes (174) are loose in the rotational direction and the circumferential direction, the engagement pieces (114) and the engagement holes (174) are sized so as to be fitted in and on each other in such a way as to eliminate a radial looseness of the armature (17) relative to the output drum (11). Thus, the radial movement of the armature (17) relative to the output drum (11) can be restricted by virtue of engagement between the individual engagement pieces (114) and the individual engagement holes (174). Accordingly, the recessed portions (173b) and raised portions (173a) of the armature (17) can be fitted on and in the raised portions (113a) and recessed portions (113b) of the output drum (11) in an ensured fashion, and the driving force can surely be transmitted from the armature (17) to the output drum (11).

A wave washer (28) is provided between the rotor (16) and the armature (17). This wave washer (28) is fitted on the diametrically expanded portion (104) of the shaft (10) and biases the armature (17) in such a manner that the friction surface (171) of the armature (17) is separated away from the friction surface (164) of the rotor (16). Accordingly, an axial looseness of both the rotor (16) and the armature (17) therebetween is prevented. In addition, the armature (17) is brought into abutment with the internal side of the end lid portion (112) of the output drum (11), and the axial traveling amount thereof is restricted.

When the electromagnetic coil (14) is energized, that is, in such a state that the clutch mechanism (12) is engaged, the armature (17) is magnetically attracted to the rotor (16), so as to transmit the rotation of the motor (8) to the output drum (11) via the worm (24), the worm wheel (9), the damper plate (19), the rotor (16) and the armature (17). When the driving force of the motor (8) is transmitted to the output drum (11), the cable (13) is taken up round the output drum (11), and the sliding door (1) can be moved in a closing direction or opening direction. In addition, when the electromagnetic coil (14) is not energized, that is, in such a state that the clutch mechanism (12) is disengaged, since the connection between the rotor (16) and the armature (17) is disrupted, the sliding door (1) can manually be closed or opened without reversing the worm wheel (9) and the motor (8).

In the embodiment that is configured as has been heretofore, the power transmission portion for transmitting the driving force of the motor (8) from the armature (17) to the output drum (11) is realized by virtue of the engagement between the raised portions (113) and the recessed portions (113b) which are the drum side locking portion of the output drum (11) and the recessed portions (173b) and the raised portions (173a) which are the armature side locking portion of the armature (17) and is set in the position which is spaced away in the radial direction from the rotational center of the armature (17) and the output drum (11) to the maximum extent. Accordingly, the load applied at the power transmission portion can be decreased, and there is no need to increase the strength at the power transmission portion or form the output drum (11) of a resin material with high strength.

While the embodiment of the invention has been described heretofore, various modifications and alterations can be given to the embodiment without departing from the spirit and scope thereof as below.

(i) The shaft (10) is formed as a separate member from the output drum (11).

(ii) The shaft (10) is coupled direct to the worm wheel (9) without interposing the damper plate (19) therebetween.

(iii) The engagement holes (174) are provided on the end lid portion (112) side, whereas the engagement pieces (114) are provided on the armature (17) side.

(iv) As the means for restricting the radial movement of the armature (17) relative to the output drum (11), the fitting accuracy in terms of dimensions of the shaft (10) into the through hole (151) in the armature (17) is severely controlled, so as to restrict the radial movement of the armature (17) relative to the output drum (11), whereby the omission of the engagement pieces (114) and the engagement holes (174) can be realized.

(v) The open/close member is used as, in place of the sliding door (1), a rear door, a sunroof or a tightly open/close apparatus.

What is claimed is:

1. An open/close member driving apparatus comprising:
   a motor;
   a transmission member for transmitting a driving force of the motor to an open/close member;
   a speed reduction mechanism;
   a base member;
   a field core that comprises an electromagnetic coil and is fixed to the base member;
   a shaft with a first end portion and a second end portion;
   a rotor that is rotatably fitted on an outer circumference of the shaft and passes through a central portion of the field core to be connected to the speed reduction mechanism, the shaft extending along an axis of rotation of the rotor and passing through the rotor;
   an armature fitted on the shaft rotatably and movably in an axial direction of the shaft and comprises an armature side locking portion on an outer circumferential portion thereof, the armature being magnetically attracted to the rotor when the electromagnetic coil is energized; and
   an output drum that is integrally formed as one piece with the shaft and is pivotally supported on the base member via the shaft,
   wherein the armature is accommodated inside of the output drum,
   wherein the transmission member is wound onto an outer circumferential surface of the output drum,
   wherein an inner circumferential surface of the output drum comprises a drum side locking portion, the drum side locking portion engaging with the armature side locking portion in a rotational direction such that a rotation of the armature is transmitted to the output drum and the armature is movable in the axial direction of the shaft,
   wherein the shaft is formed integrally in a central portion of an end lid portion of the output drum such that the first end portion of the shaft projects from the end lid portion at a first side and the second end portion of the shaft projects from the end lid portion at a second side.

2. The open/close member driving apparatus according to claim 1, wherein the drum side locking portion comprises a recessed portion and a raised portion extending in the axial direction and provided alternately in a circumferential direction.

3. The open/close member driving apparatus according to claim 2, wherein the drum side locking portion comprises a plurality of recessed portions and raised portions.

4. The open/close member driving apparatus according to claim 2, wherein the armature side locking portion comprises a recessed portion and a raised portion that are provided alternately in the circumferential direction in such a manner as to fit in and on the recessed portion and raised portion of the drum side locking portion.

5. The open/close member driving apparatus according to claim 4, wherein the armature side locking portion comprises a plurality of recessed portions and raised portions.

6. The open/close member driving apparatus according to claim 1, further comprising a wave washer between the rotor and the armature.

7. The open/close member driving apparatus according to claim 1, wherein an engagement piece protruding in the axial direction is provided on one of the second side of the end lid portion of the output drum and a side of the armature that face each other,
   wherein an engagement hole is provided on another one of the second side of the end lid portion of the output drum and the side of the armature, and
   wherein the engagement piece engages with the engagement hole so as to restrict a radial movement of the armature relative to the output drum.

8. The open/close member driving apparatus according to claim 1, wherein the first end portion of the shaft is configured to pivotally fit to a housing so as to rotate freely with respect to the housing.

9. The open/close member driving apparatus according to claim 1, wherein the second end portion of the shaft is configured to be rotatably supported by a gear housing so as to rotate freely with respect to the gear housing.

10. The open/close member driving apparatus according to claim 1, wherein the armature is configured to always rotate in synchronization with the shaft.

* * * * *